(12) United States Patent
Tsubaki et al.

(10) Patent No.: US 12,198,550 B2
(45) Date of Patent: Jan. 14, 2025

(54) VIDEO DISTRIBUTION APPARATUS, VIDEO DISTRIBUTION METHOD AND PROGRAM

(71) Applicant: Nippon Telegraph and Telephone Corporation, Tokyo (JP)

(72) Inventors: Takuma Tsubaki, Musashino (JP); Ryota Ishibashi, Musashino (JP); Yuki Nakahara, Musashino (JP); Kotaro Ono, Musashino (JP); Takeshi Kuwahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 202 days.

(21) Appl. No.: 17/919,116

(22) PCT Filed: Apr. 16, 2020

(86) PCT No.: PCT/JP2020/016732
§ 371 (c)(1),
(2) Date: Oct. 14, 2022

(87) PCT Pub. No.: WO2021/210134
PCT Pub. Date: Oct. 21, 2021

(65) Prior Publication Data
US 2023/0169862 A1 Jun. 1, 2023

(51) Int. Cl.
*G08G 1/16* (2006.01)
*G06V 20/58* (2022.01)
*H04N 21/2662* (2011.01)

(52) U.S. Cl.
CPC ............... *G08G 1/16* (2013.01); *G06V 20/58* (2022.01); *H04N 21/2662* (2013.01)

(58) Field of Classification Search
CPC ........................................................ G08G 1/16
See application file for complete search history.

(56) References Cited

U.S. PATENT DOCUMENTS 10,466,697 B2 * 11/2019 Yunoki .................. G07C 5/008
11,366,477 B2 *  6/2022 Hasegawa .............. G08G 1/143
(Continued)

FOREIGN PATENT DOCUMENTS

| JP | 2009-094885 | 4/2009 |
| JP | 2009-239673 | 10/2009 |
| WO | WO 2018/167891 | 9/2018 |

OTHER PUBLICATIONS

[No Author Listed], "Summary of Proceedings of the 3rd Investigation and Review Committee for the Phased Realization of Autonomous Driving," Oct. 4, 2016, 11 pages (Machine Translation).
(Continued)

*Primary Examiner* — Michael A Berns
(74) *Attorney, Agent, or Firm* — Fish & Richardson P.C.

(57) ABSTRACT

A video distribution device according to an embodiment is a video distribution device that distributes videos from a plurality of cameras installed in each of a plurality of vehicles that perform autonomous driving to a terminal, and includes a probability of collision calculating unit that calculates a probability of collision indicating a probability of the vehicles colliding with an object by a predetermined time of day, a selecting unit that selects, out of the videos of the plurality of cameras, video from a camera installed in a vehicle of which the probability of collision is highest, and a control unit for setting video quality of the video of the selected camera to be high.

18 Claims, 8 Drawing Sheets

(56) References Cited

U.S. PATENT DOCUMENTS

| | | | |
|---|---|---|---|
| 2021/0173400 A1 | 6/2021 | Hasegawa et al. | |
| 2022/0277164 A1* | 9/2022 | Malayath | G05D 1/0221 |
| 2023/0169862 A1* | 6/2023 | Tsubaki | G06V 10/993 |

OTHER PUBLICATIONS

Director of Traffic Bureau, National Police Agency, "Regarding the formulation of "standards for handling road use permission applications related to public road demonstration experiments of remote automated driving systems" (Notice)," Jun. 1, 2017, 17 pages, (Machine Translation).

Ministry of Land, Infrastructure, Transport and Tourism Chubu District Transport Bureau Automobile Technology and Safety Department Technology Division, "New remote-type demonstration experiment on last-mile autonomous driving will start ~ World's first public road demonstration of remote-type automated driving in which one remote driver operates two vehicles," Technical Division, Automotive Engineering and Safety Department, Chubu District Transport Bureau, Nov. 14, 2018, 21 pages, (Machine Translation).

monoist.itmedia.co.jp [online], "Establishment of a center for remote monitoring and operation so that driverless vehicles can be ridden with peace of mind," Sep. 28, 2018, retrieved from URL<https://monoist.itmedia.co.jp/mn/articles/1809/28/news063.html>, 11 pages (Machine Translation).

monoist.itmedia.co.jp [online], "Remote monitoring of multiple self-driving cars by one person, "world's first" public road demonstration in Eiheiji Town, Fukui Prefecture," Nov. 16, 2018, retrieved from URL<https://monoist.itmedia.co.jp/mn/articles/1811/16/news030.html>, 9 pages (Machine Translation).

\* cited by examiner

| MAJOR CLASSIFICATIONS | MINOR CLASSIFICATIONS | COEFFICIENT a | VELOCITY [km/h] |
|---|---|---|---|
| PERSON | CHILD | 1 | 3.6 |
| | ADULT | 1 | 4.5 |
| ANIMAL | PEST | 0 | 8.0 |
| | OTHER | 1 | 8.0 |

LABELS

VIDEO DISTRIBUTION APPARATUS, VIDEO DISTRIBUTION METHOD AND PROGRAM

CROSS-REFERENCE TO RELATED APPLICATIONS

This application is a National Stage application under 35 U.S.C. § 371 of International Application No. PCT/JP2020/016732, having an International Filing Date of Apr. 16, 2020, the disclosure of which is considered part of the disclosure of this application, and is incorporated by reference in its entirety into this application.

TECHNICAL FIELD

The present invention relates to a video distribution device, a video distribution method, and a program.

BACKGROUND ART

In recent years, utilization of autonomous driving level 3 (conditional driving automation) in agricultural machines such as tractors and so forth is being advanced. In order to secure safety for autonomous driving level 3 agricultural machines, remote surveillance for performing emergency stopping, emergency operations, and so forth, is mandated. Accordingly, various types of studies are being undertaken regarding problem points during remote surveillance and so forth (e.g., NPL 1).

In autonomous driving level 3, surveillance of two to three vehicles by one surveillant through creativity in interfaces used by the surveillant, and training surveillants, is being planned (e.g., NPL 2). Also, when a surveillant performing surveillance of a plurality of vehicles performs remote operations of one vehicle, surveillance and operations of other vehicles is difficult for this surveillant, and accordingly, there is known a function to automatically stop the other vehicles safely, and restart the other vehicles after the remote operations are completed (e.g., NPL 3 to 5).

CITATION LIST

Non Patent Literature

[NPL 1] "*Dai 3 kai Jidou unten no dankaiteki jitsugen ni muketa chousa kentou iinkai giji gaiyou* (Summary of Proceedings of Third Research and Review Committee for Stepwise Realization of Autonomous Driving)", Internet <URL: https://www.npa.go.jp/koutsuu/kikaku/jidounten/kentoiinkai/03/gijigaiyou.pdf>

[NPL 2] "*Mujin unten sha ni anshin shite jousha suru tameni, enkaku kara kanshi, sousa suru center kaisetu—MONOist* (Center Opened for Remote Surveillance and Operation, to Ride Unmanned Driving Vehicles Reassured—MONOist)", Internet <URL: https://monoist.atmarkit.co.jp/mn/articles/1809/28/news063.html>

[NPL 3] "*Hitori de fukusuu dai no jidou unten sha wo enkaku kanshi, fukuiken eiheiji cho de "sekai hatsu" no koudou jisshou—MONOist* (Remote Surveillance of Multiple Autonomous Driving Vehicles by One Person, 'World's First' Public Road Demonstration in Eiheiji-cho, Fukui Prefecture—MONOist)", Internet <URL: https://monoist.atmarkit.co.jp/mn/articles/1811/16/news030.html>

[NPL 4] "*Last mile jidou soukou ni kansuru aratana enkaku gata jisshou jikken wo kaishi shimasu—Enkaku driver 1 mei ga 2 dai no sharyou wo unyou suru enkaku gata jidou unten no sekai hatsu no koudou jisshou*—(Starting New Remote Demonstrative Experiment Regarding Last-Mile Autonomous Driving ~World's First Public Road Demonstration of Remote Autonomous Driving with One Remote Driver Running Two Vehicles-)", Internet <URL: https://wwwtb.mlit.go.jp/chubu/press/pdf/gian20181114.pdf>

[NPL 5] "*Enkaku gata jidou unten system no koudou jisshou jikkenn ni kakaru douro shiyou kyoka no shinsei ni taisuru toriatsukai no kijun* (Standard for Handling Applications for Road Use Permits Relating to Public Road Demonstration Experiments of Remote-Type Autonomous Driving Systems)", Internet <URL: https://www.npa.go.jp/laws/notification/koutuu/kouki/290601koukih92.pdf>

SUMMARY OF THE INVENTION

Technical Problem

However, there is a limit in scaling, regarding the number of vehicles that one surveillant can perform surveillance of, with the conventional technology or technique. That is to say, it is thought that surveillance of only around two to three vehicles can be performed through creativity in interfaces, training of surveillants, and so forth, for example.

Contrastingly, in a case of performing surveillance of a plurality of agricultural machines working on a farm or the like, for example, it is thought that surveillance of all agricultural machines does not necessarily have to be performed equally. For example, while surveillance of agricultural machines that have a possibility of colliding with some sort of object (including people, animals, other agricultural machines, and so forth) needs to be performed with particular caution, it is conceivable that surveillance could be relatively relaxed (or no surveillance performed) regarding agricultural machines that are dissimilar therefrom. Accordingly, it is thought that the scaling limit regarding the number of agricultural machines can be improved by variously weighting agricultural machines that are the object of surveillance, selecting agricultural machines for actual surveillance, and so forth.

An embodiment of the present invention has been made in light of the foregoing point, and it is an object thereof to realize a high level of scaling regarding surveillance-object vehicles in autonomous driving.

Means for Solving the Problem

In order to achieve the above object, a video distribution device according to an embodiment is a video distribution device that distributes videos from a plurality of cameras installed in each of a plurality of vehicles that perform autonomous driving to a terminal, and includes a probability of collision calculating unit that calculates a probability of collision indicating a probability of the vehicles colliding with an object by a predetermined time of day, a selecting unit that selects, out of the videos of the plurality of cameras, video from a camera installed in a vehicle of which the probability of collision is highest, and a control unit for setting video quality of the video of the selected camera to be high.

Effects of the Invention

A high level of scaling regarding surveillance-object vehicles can be realized in autonomous driving.

BRIEF DESCRIPTION OF DRAWINGS

FIG. 4 is a diagram showing an example of a label DB.

DESCRIPTION OF EMBODIMENTS

An embodiment of the present invention will be described below. Description will be made below regarding a video distribution system 1 in which agricultural machines that are autonomously driven on a farm or the like are taken as surveillance-object vehicles, and when distributing video from cameras installed in these agricultural machines to a remote surveillance location, the video quality (resolution, framerate) is controlled in accordance with the probability of collision of the agricultural machines. More specifically, description will be made below regarding the video distribution system 1 in which video of agricultural machines regarding which the probability of colliding with some sort of object (including people, animals, other agricultural machines, and so forth) is high is distributed with high video quality, and video of agricultural machines regarding which the possibility of colliding with some sort of object is low is distributed with low video quality. Thus, surveillance of agricultural machines of which the probability of collision is high is performed by clear video, and surveillance of agricultural machines dissimilar therefrom is performed by relatively unclear video. Accordingly, the surveillant can weight the agricultural machines of which surveillance is to be performed thereby. Thus, the surveillant is capable of surveillance of a great number of agricultural machines, and a high level of scaling can be realized regarding the number of agricultural machines that are surveillance-object vehicles in autonomous driving.

First Embodiment

First, a first embodiment will be described.

Overall Configuration

Figure 1:
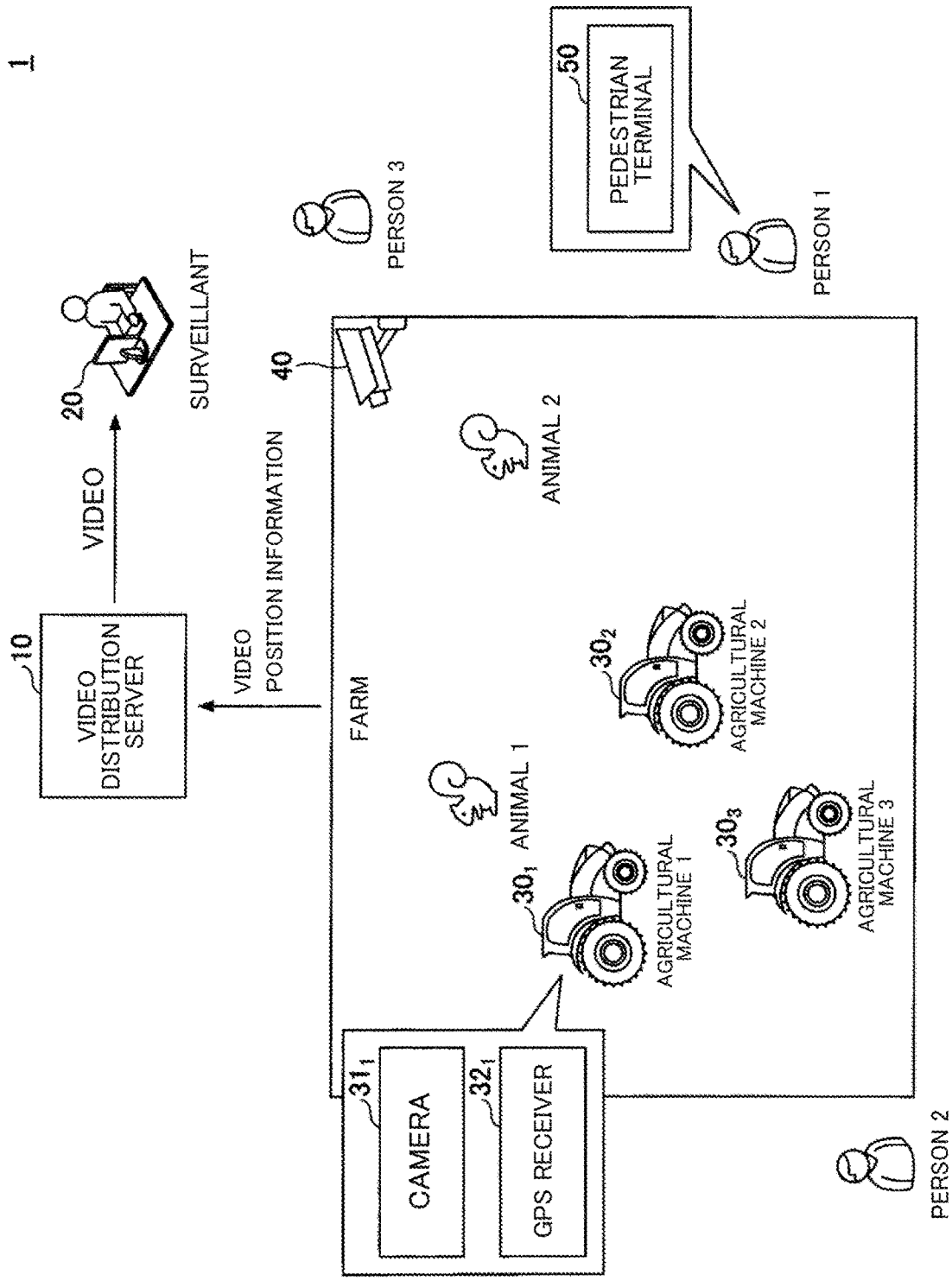
FIG. 1 is a diagram illustrating an example of an overall configuration of a video distribution system according to a first embodiment.

An overall configuration of the video distribution system 1 according to the present embodiment will be described with reference to FIG. 1. FIG. 1 is a diagram illustrating an example of the overall configuration of the video distribution system 1 according to the first embodiment.

As illustrated in FIG. 1, the video distribution system 1 according to the present embodiment includes a video distribution server 10, a surveillant terminal 20, one or more agricultural machines 30, and one or more cameras 40.

The video distribution server 10 is a server installed in a system environment at the edge or in the cloud, and distributes video of the cameras installed in the agricultural machines 30 to the surveillant terminal 20. At this time, the video distribution server 10 controls the video quality of each video in accordance with the probability of collision of each agricultural machine 30. Note that the system environment at the farm and the surroundings thereof is referred to as a local, in contrast to the system environment at the edge or in the cloud.

The surveillant terminal 20 is a terminal installed in a system environment that is a remote location from the local, and is used by a surveillant that performs surveillance of video of cameras installed in the agricultural machines 30 that are autonomously driven. The surveillant is an operator or the like that performs surveillance of video distributed to the surveillant terminal 20, and performs operations such as emergency stopping, emergency operations, or the like, in a case of an agricultural machine 30 being close to colliding with some sort of object, or the like, for example.

The agricultural machines 30 are vehicles that perform autonomous driving in accordance with action plans set in advance, for example. Now, each agricultural machine 30 has installed therein a camera 31 for taking video ahead of the agricultural machine 30 (and the surroundings thereof), and a GPS (Global Positioning System) receiver 32 for position determination of the current position of the agricultural machine 30. The agricultural machine 30 transmits the video taken by the camera 31, and position information indicating the current position that is determined by the GPS receiver 32, to the video distribution server 10. Hereinafter, a plurality of agricultural machines 30 will be distinguished by notation such as "agricultural machine $30_1$", "agricultural machine $30_2$", "agricultural machine $30_3$", and so forth. Also, the camera 31 and the GPS receiver 32 installed in the agricultural machine $30_1$ will be respectively written as "camera $31_1$" and "GPS receiver $32_1$", the camera 31 and the GPS receiver 32 installed in the agricultural machine $30_2$ respectively as "camera $31_2$" and "GPS receiver $32_2$", and the camera 31 and the GPS receiver 32 installed in the agricultural machine $30_3$ respectively as "camera $31_3$" and "GPS receiver $32_3$", and so forth.

Note that in the present embodiment, the term agricultural machine 30 means an agricultural machine that has traction devices such as wheels, continuous tracks, or the like. Specific examples of agricultural machines 30 include tractors, combine harvesters, and so forth. Note however, that these are only examples, and any agricultural machine capable of autonomous driving (autonomous traveling or autonomous navigation) may be included in agricultural machines 30. Specific examples of agricultural machine 30 may include agricultural drones, agricultural vessels, and so forth.

The camera 40 is a video shooting device that is installed in the farm or in the surroundings thereof. The camera 40 transmits video taken of the farm and the surroundings thereof to the video distribution server 10. Accordingly, the position information of objects (animals, people, etc.) present in the farm and the surroundings thereof can be managed by the video distribution server 10 from this video. Hereinafter, in order to distinguish between video taken by the camera 31 and video taken by the camera 40, video taken by the camera 31 will also be referred to as "surveillance video", and video taken by the camera 40 will also be referred to as "position identifying video".

Note that the overall configuration of the video distribution system 1 illustrated in FIG. 1 is an example, and other configurations may be made. For example, a plurality of surveillant terminals 20 may be included in the video distribution system 1, and a plurality of cameras 40 may be included. The video distribution system 1 may also include a pedestrian terminal 50 possessed by a person walking in the farm and the surroundings thereof.

In a case in which the video distribution system 1 includes the pedestrian terminal 50, a GPS receiver may be installed in this pedestrian terminal 50, and position information indicating the current position of the pedestrian may be transmitted to the video distribution server 10. Accordingly, the video distribution server 10 can manage position information of the pedestrian at each time of day. Note that examples of pedestrian terminals 50 that can be used include smartphones, wearable devices, and so forth. Hereinafter, when distinguishing among a plurality of people, notation will be made as "person 1", "person 2", "person 3", and so forth.

<Hardware Configuration>

Figure 2:
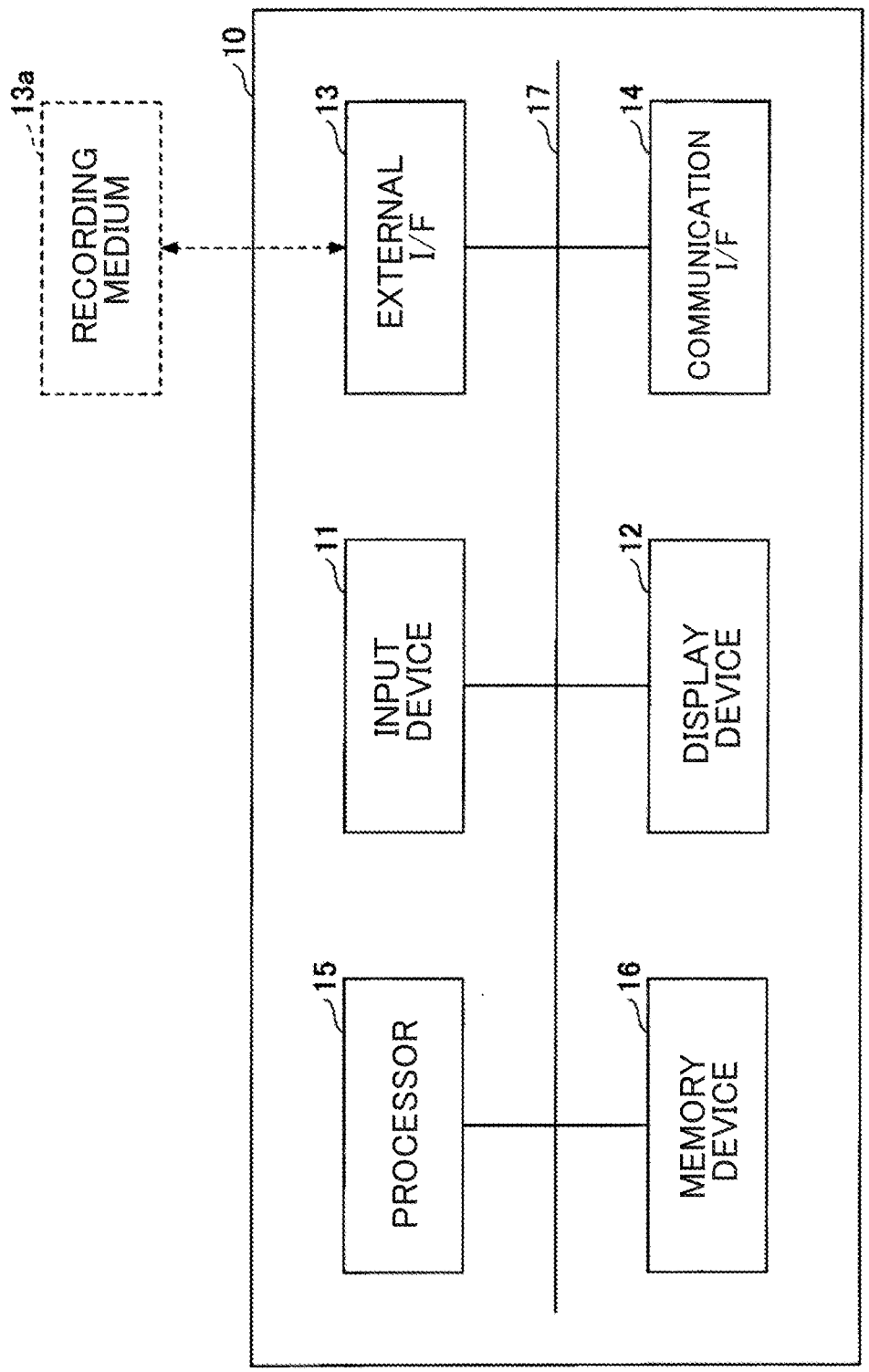
FIG. 2 is a diagram illustrating an example of a hardware configuration of a video distribution server according to the first embodiment.

Next, a hardware configuration of the video distribution server 10 according to the present embodiment will be described with reference to FIG. 2. FIG. 2 is a diagram illustrating an example of a hardware configuration of the video distribution server 10 according to the first embodiment.

As illustrated in FIG. 2, the video distribution server 10 according to the present embodiment is realized by a general computer or computer system, and includes an input device 11, a display device 12, an external I/F 13, a communication I/F 14, a processor 15, and a memory device 16. Each of these pieces of hardware are communicably connected via a bus 17.

The input device 11 is, for example, a keyboard, mouse, touch panel, or the like. The display device 12 is, for example, a display or the like. Note that the video distribution server 10 does not have to have at least one of the input device 11 and the display device 12.

The external I/F 13 is an interface with various types of external devices, such as a recording medium 13a and so forth. The video distribution server 10 can read from and write to the recording medium 13a and so forth, for example, via the external I/F 13. Note that examples of the recording medium 13a include CDs (Compact Disc), DVDs (Digital Versatile Disk), SD memory cards (Secure Digital memory card), USB (Universal Serial Bus) memory cards, and so forth.

The communication I/F 14 is an interface for connecting the video distribution server 10 to a communication network. The processor 15 is various types of computing devices, such as, for example, a CPU (Central Processing Unit) or the like. The memory device 16 is various types of storage devices such as, for example, HDDs (Hard Disk Drive), SSDs (Solid State Drive), RAM (Random Access Memory), ROM (Read Only Memory), flash memory, and so forth.

The video distribution server 10 according to the present embodiment can realize the later-described video distribution processing by having the hardware configuration illustrated in FIG. 2. Note that the hardware configuration illustrated in FIG. 2 is an example, and the video distribution server 10 may have other hardware configurations. For example, the video distribution server 10 may have a plurality of processors 15, and may have a plurality of memory devices 16.

<Functional Configuration>

Figure 3:
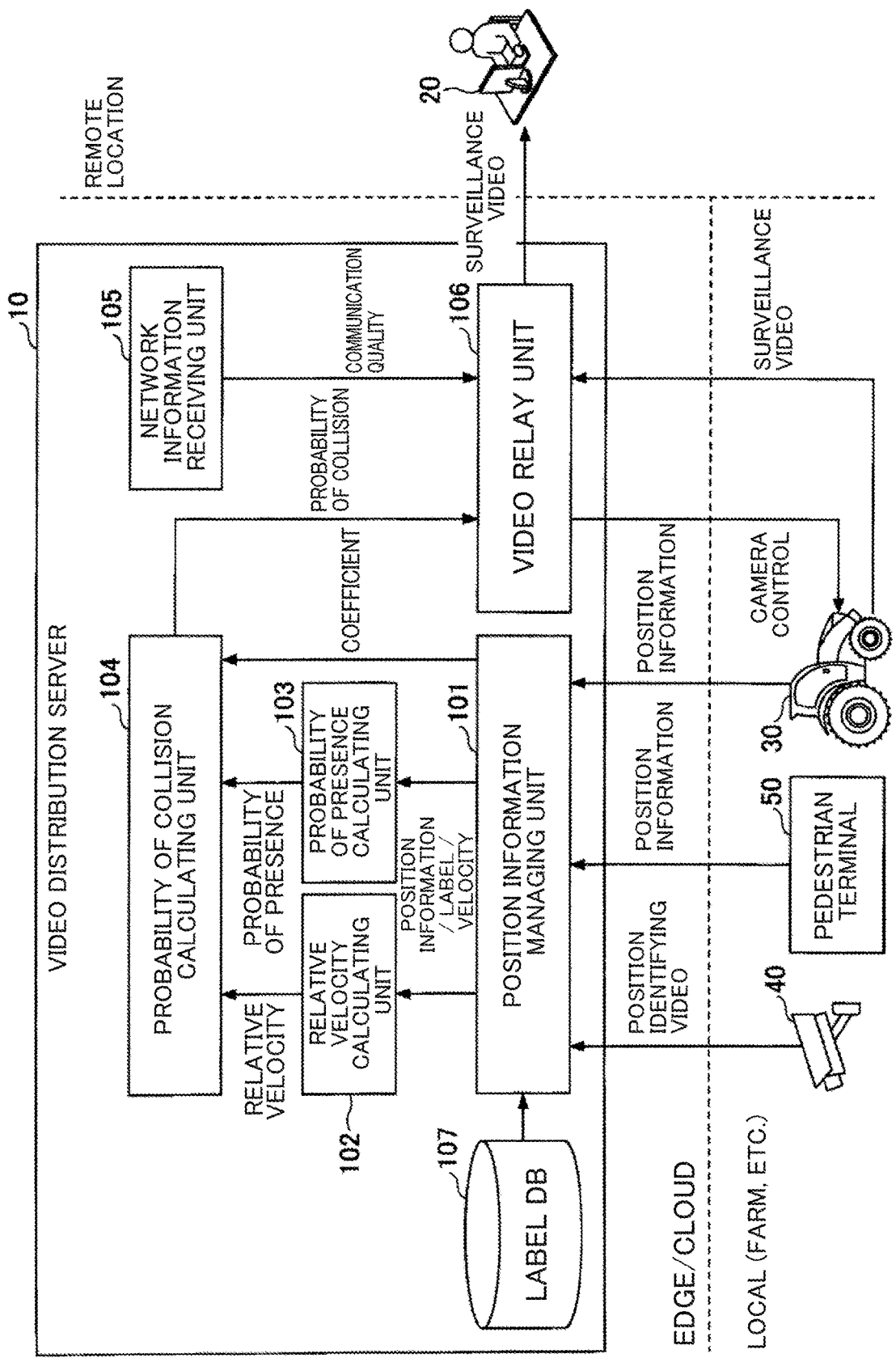
FIG. 3 is a diagram illustrating an example of a functional configuration of the video distribution server according to the first embodiment.

Next, a functional configuration of the video distribution server 10 according to the present embodiment will be described with reference to FIG. 3. FIG. 3 is a diagram illustrating an example of a functional configuration of the video distribution server 10 according to the first embodiment.

As illustrated in FIG. 3, the video distribution server 10 according to the present embodiment includes a position information managing unit 101, a relative velocity calculating unit 102, a probability of presence calculating unit 103, a probability of collision calculating unit 104, a network information receiving unit 105, and a video relay unit 106. These units are each realized by processing that one or more programs installed in the video distribution server 10 causes the processor 15 to execute, for example.

Also, the video distribution server 10 according to the present embodiment has a label DB 107. This DB is realized by the memory device 16, of example.

The position information managing unit 101 receives position information from each of the agricultural machines 30 and each of the pedestrian terminals 50, and also receives position identifying video from the camera 50. The position information managing unit 101 also identifies positions of the objects (e.g., animals, people, etc.) from the position identifying video, and generates position information indicating the identified positions. The position information received from the agricultural machines 30 and the pedestrian terminals 50, and the position information identified from the position identifying video, are saved in the memory device 16 or the like at each time of day and for each object (animal, person, etc.) or agricultural machine 30, for example. At this time, in a case in which the position information received from a pedestrian terminal 50 and position information identified from the position identifying video represent position information of the same person, these pieces of position information preferably are saved in the memory device 16 or the like as position information of the same person, but may be saved in the memory device 16 or the like as position information of different people. Note that the position information managing unit 101 can identify the positions of the objects from the position identifying video by known object recognition technology or the like. Also, the position information may be absolute position coordinates expressed in latitude and longitude or the like, for example, or may be relative position coordinates from some sort of reference (e.g., a certain particular agricultural machine 30, a reference point set in the farm, or the like), as long as unified.

The relative velocity calculating unit 102 calculates the relative velocity between the objects (e.g., animals, people) and the agricultural machines 30, using the position information of the objects, and the labels and the velocities stored in the label DB 107. Note that a label means a classification of an object, and the velocity (more accurately, speed) of objects is decided in advance for each label, which will be described later.

The probability of presence calculating unit 103 calculates the probability of presence of each object (e.g., animals, people) within a predetermined region (e.g., within the farm or the like) until a predetermined time of day (e.g., the time of day for ending farmwork or the like), using the position information of each object, and the label and the velocity stored in the label DB 107. Note that the probability of presence calculating unit 103 can calculate the probability of presence of each object within the predetermined region until the predetermined time of day by techniques described in, for example, Reference Literature 1 "Daisuke Sugimura, Yoshinori Kobayashi, Yoichi Sato, Akihiro Sugimoto, 'Tracking People using Adaptive Environmental Attribute based on Long-Term Observation of Human Actions', Journal of Information Processing Society of Japan, Computer Vision and Image Media Vol. 1 No. 2 100-110 (July 2008)" Reference Literature 2 "Hiromi Tanaka, Atsuhiro Takasu, Hayato Yamana, 'Position Information Prediction of Pedestrians Using MAP Estimation—With POI Estimation as an Object—', DENIM Forum 2018 H5-4", and so forth.

The probability of collision calculating unit 104 calculates the probability of collision of each agricultural machine 30 with any of the objects by the predetermined time of day (probability of collision), using the probability of presence of the objects and the coefficient decided for each label of the objects.

The network information receiving unit 105 receives communication quality (e.g., communication bandwidth, etc.) of the communication network between the video distribution server 10 and the agricultural machines 30. Note that the network information receiving unit 105 can receive communication quality from an external device or equipment that measures or predicts communication quality of the communication network between the video distribution server 10 and the agricultural machines 30, for example. However, the network information receiving unit 105 may measure or predict this communication quality, for example.

The video relay unit 106 controls the video quality (resolution, framerate) of the cameras 31 installed in the agricultural machines 30, in accordance with the probability of collision of these agricultural machines 30. That is to say, the video relay unit 106 controls the camera 31 installed in an agricultural machine 30 of which the probability of collision is high, to raise the video quality of this camera 31. Conversely, the video relay unit 106 controls the cameras 31 installed in each of the other agricultural machines 30 in accordance with the communication quality (e.g., communication bandwidth, etc.) of the communication network between the video distribution server 10 and the surveillant terminal 20, and lowers the video quality of these cameras 31. The video relay unit 106 then distributes the surveillance video received from the agricultural machines 30 to the surveillant terminal 20.

The label DB 107 stores information (labels, coefficients, velocities) used in calculation of the relative velocity between each of the agricultural machines 30 and each of the objects, calculation of the probability of presence of each of the objects, calculation of the probability of collision of the agricultural machine 30, and so forth. An example of information stored in the label DB 107 will now be described with reference to FIG. 4. FIG. 4 is a diagram showing an example of the label DB 107.

As shown in FIG. 4, labels, coefficients a, and velocities v are stored in the label DB 107 in a correlated manner. The labels also include major classifications and minor classifications. Here, the coefficient a represents whether or not there is no problem with colliding with an agricultural machine 30, a case in which a=1 indicates that collision is impermissible, and a case in which a=0 indicates that there is no problem with collision.

For example, coefficient a=1 and velocity v=3.6 are correlated with the label of the major classification "person" and the minor classification "child". In the same way, coefficient a=1 and velocity v=4.5 are correlated with the label of the major classification "person" and the minor classification "adult". In the same way, coefficient a=0 and velocity v=8.0 are correlated with the label of the major classification "animal" and the minor classification "pest".

Coefficient a=1 and velocity v=8.0 are correlated with the label of the major classification "animal" and the minor classification "other".

Thus, the label DB 107 has the coefficient a indicating whether collision is permissible or not, and a velocity v (speed to be accurate) decided in advance, stored in a correlated manner, for each label representing the type of object.

<Video Distribution Processing>

Figure 5:
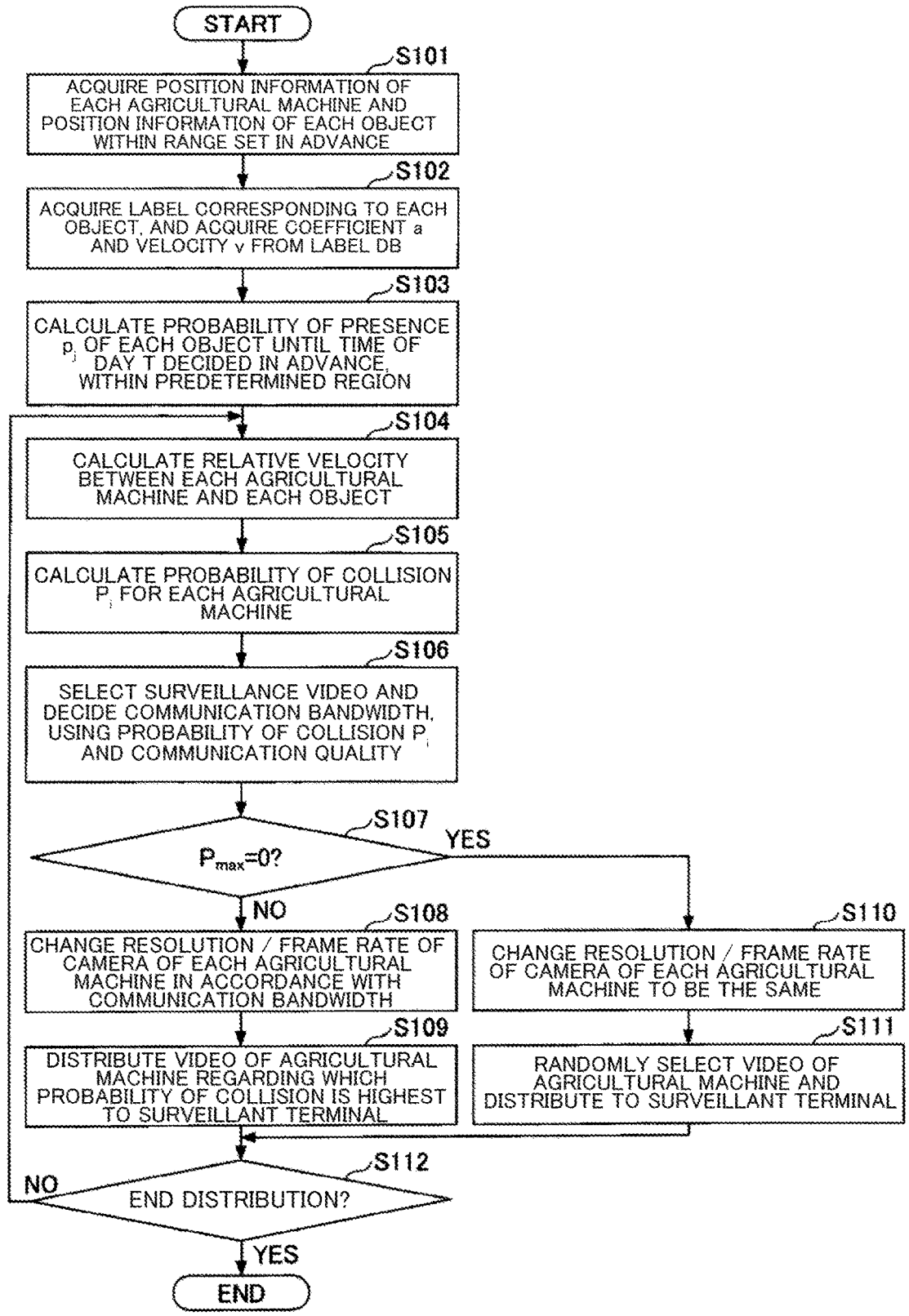
FIG. 5 is a flowchart showing an example of video distribution processing according to the first embodiment.

Next, video distribution processing for the video distribution server 10 according to the present embodiment to distribute surveillance video to the surveillant terminal 20 will be described with reference to FIG. 5. FIG. 5 is a flowchart showing an example of video distribution processing according to the first embodiment.

First, the position information managing unit 101 acquires position information of each of the agricultural machines 30 and each of the objects (animals, people, etc.) until the current time of day (step S101). Note that the position information managing unit 101 can obtain position information up to the current time of day for each of the agricultural machines 30 and each of the objects from the memory device 16 or the like, for example.

Next, the position information managing unit 101 acquires the label, the coefficient a, and the velocity v corresponding to each object, from the label DB 107 (step S102). That is to say, in a case in which the objects of animal 1 to animal 2, and person 1 to person 3, are present in the farm and the surroundings thereof, for example, label "animal, pest", coefficient a=0, and velocity v=8.0 for animal 1, label "animal, pest", coefficient a=0, and velocity v=8.0 for animal 2, label "person, adult", coefficient a=1, and velocity v=4.5 for person 1, label "person, adult", coefficient a=1, and velocity v=4.5 for person 2, and label "person, adult", coefficient a=1, and velocity v=4.5 for person 3, are acquired.

Next, the probability of presence calculating unit 103 uses the position information, label, and velocity of each object to calculate the probability of presence of each object within a predetermined region until a predetermined time of day (step S103). The predetermined time of day can be the time of day for ending farmwork, and the predetermined region can be within the farm, for example, as described above. In this case, the probability of presence calculating unit 103 calculates the probability of presence of each object within the farm until the time of day for ending farmwork. Hereinafter, with the total number of objects as N, the probability of presence of a j (j=1, ..., N)'th object (hereinafter referred to as "object j") in a certain region k will be expressed as $p_{kj}$. Note that known techniques are used for calculating the probability of presence, as described above.

Figure 6:
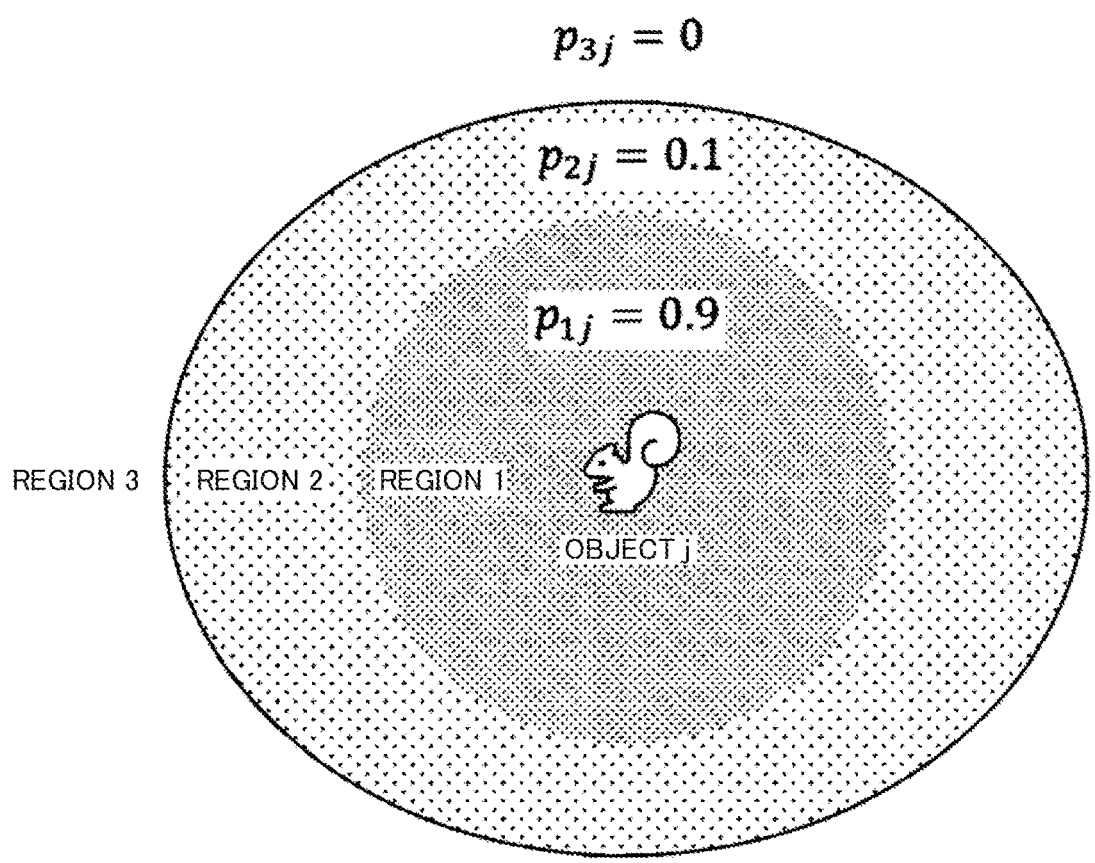
FIG. 6 is a diagram for describing an example of probability of presence.

Now, an example of calculation results of a probability of presence $p_{kj}$ of a certain object j is illustrated in FIG. 6. In the example illustrated in FIG. 6, the probability of presence in a region 1 in the surroundings of the object j is $p_{1j}$=0.9, the probability of presence in a region 2 is $p_{2j}$=0.1, and the probability of presence in a region 3 other than region 1 and region 2 (e.g., a region that is inside of the farm, and is other than region 1 and region 2) is $p_{3j}$=0. This represents that the probability that this object j will be in region 1 at some time by the time of day for ending farmwork is $p_{1j}$=0.9, the probability that this object j will be in region 2 at some time by the time of day for ending farmwork is $p_{3j}$=0.1, and the probability that this object j will be in region 3 that is other than these is $p_{3j}$=0.

Note that in the example illustrated in FIG. 6, region 1 is a circular or elliptic region around the object j, and region 2 is a circular or elliptic region therearound, but this is not limiting, and the probability of presence in regions of any shape may be calculated. For example, the probability of presence in mesh-like rectangular regions may be calculated. Also, in the example illustrated in FIG. 6, the probability of presence in the three regions of region 1, region 2, and region 3 is calculated, but the probability of presence in any number of regions may be calculated as long as one or more regions.

The processing of the subsequent step S104 to step S112 is repeatedly executed until distribution of the surveillance video ends (e.g., until the time of day for ending farmwork or the like), every predetermined duration of time (e.g., every one second to several seconds, or the like).

Figure 7:
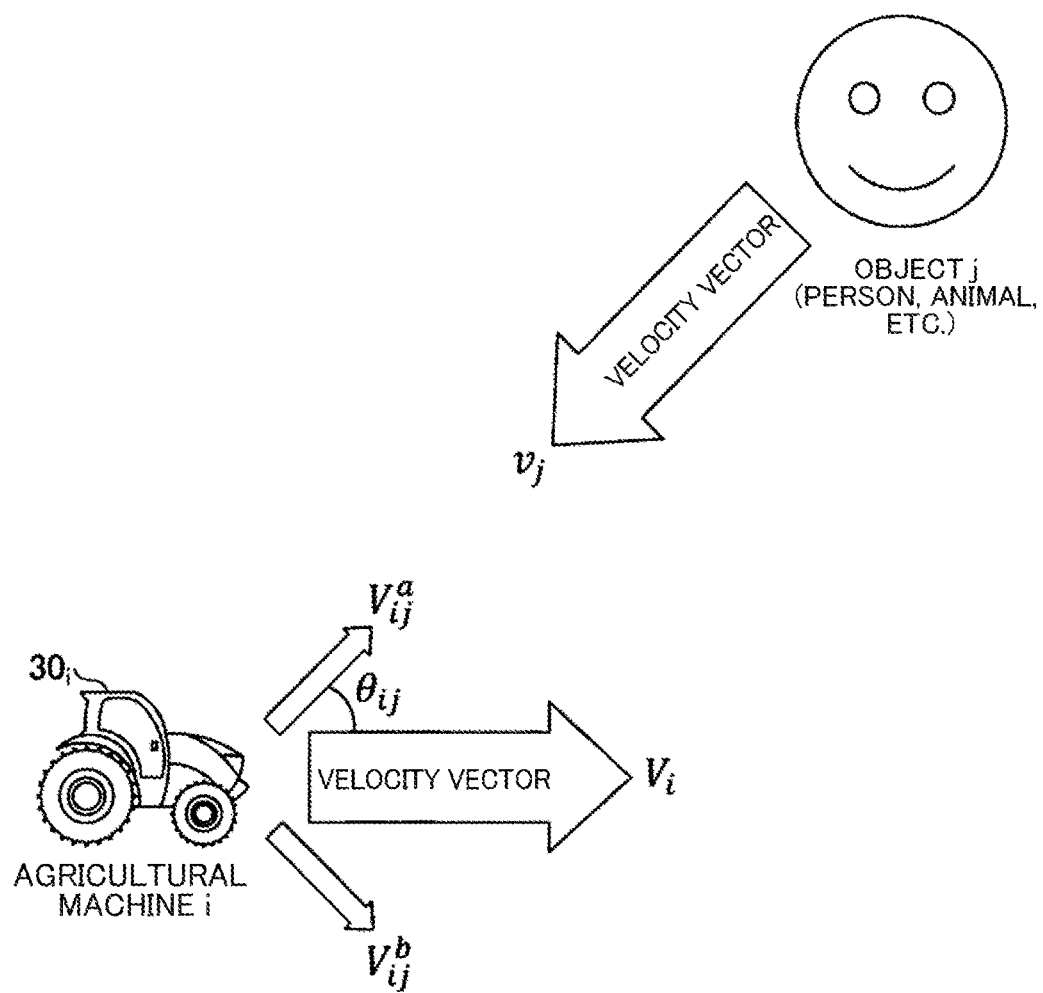
FIG. 7 is a diagram for describing an example of a relative velocity calculation method.

The relative velocity calculating unit 102 uses the position information of each object, label, and velocity (speed), to calculate the relative velocity between each object and each agricultural machine 30 (step S104). With the velocity vector of an agricultural machine $30_i$ as $V_i$, the velocity vector of an object j as $v_j$, an angle representing the direction of the object j as to the agricultural machine $30_i$ as $\theta_{ij}$, and the component of the $\theta_{ij}$ direction of the velocity vector $V_i$ as $V_{ij}^a$ (i.e., $V_{ij}^a = V_i \cos \theta_{ij}$), for example, as illustrated in FIG. 7, relative velocity $V_{ij}$ between the agricultural machine $30_i$ and the object j is calculated by $V_{ij} = v_j + V_{ij}^a$. Here, the velocity vector $v_j$ is a velocity (speed) corresponding to the label of the object j, and is a vector in a direction from the object j to the agricultural machine $30_i$.

Thus, the relative velocity calculating unit 102 calculates the relative speed assuming that each object will head toward each agricultural machine 30 over the shortest distance, at a speed corresponding to the label of that object. This is because the faster the relative speed is, the greater the number of probabilities of presence there are to be used for calculation of the probability of collision when calculating the probability of collision, which will be described later. That is to say, each object is assumed to be moving in a direction at which the probability of collision with each agricultural machine 30 is the highest.

Next, the probability of collision calculating unit 104 calculates the probability of each agricultural machine 30 colliding with one of the objects (probability of collision) by the predetermined time of day (i.e., the time of day for ending farmwork in the present embodiment), using the probability of presence of each object and the coefficient decided for each label of each object (step S105). A probability of collision $P_i$ with one of the objects by the agricultural machine $30_i$ (i=1, ..., M) by the time of day for ending farmwork can be calculated by $$P_i = 1 - \prod_{j=1}^{N}(1 - a_j q_j) \quad (i = 1, \ldots, M) \quad [\text{Math 1}]$$

where the total number of agricultural machines 30 is M, the coefficient corresponding to the label of the object j is $a_j$, the predetermined region of the surroundings of the agricultural machine $30_i$ as to the object j is $D_{ij}$, and the probability of presence of the object j in the region $D_{ij}$ is $q_j$. The above probability of presence $q_j$ is the probability of presence $p_{kj}$ of the object j in the region $D_{ij}$. Note that in a case in which the object j assumes a plurality of different probabilities of presence in the region $D_{ij}$, the highest probability of presence out of the plurality of probabilities of presence may be taken as $q_j$, or an average of these plurality of probabilities of presence may be taken as $q_j$.

Now, the region $D_{ij}$ is decided in accordance with the relative velocity $V_{ij}$ between the agricultural machine $30_i$ and the object j. For example, the region $D_{ij}$ can be a circular region centered on the agricultural machine $30_i$, with a radius of $d_{ij} = d'_{ij} + d'$. d' [m] is a distance necessary for the surveillant to confirm the object from the surveillance video, and is a value decided in advance (e.g., 5 [m] or the like). Separately, $d'_{ij}$ [m] is the distance necessary to stop the agricultural machine $30_i$, and is calculated by $d'_{ij} = t_r \times V_{ij} \times (1000/3600) + (V_i^2/(256 \times \mu))$. Note that $t_r$ is reaction time, i.e., the time [s] necessary from the surveillant recognizing the necessity to stop an agricultural machine 30, until stopping operations are performed and the relevant agricultural machine 30 is controlled, and $\mu$ is a friction coefficient.

Note that assumption is made in the present embodiment that agricultural machines 30 will not collide with each other, since the agricultural machines 30 are moving in accordance with an action plan decided in advance, but the probability of collision may be calculated taking into consideration collision of agricultural machines 30 with each other. In this case, the probability of collision of the agricultural machines 30 can be calculated by first calculating the probability of presence of the agricultural machines 30 in the above step S103, and using the probability of presence of these as well.

Next, the video relay unit 106 selects surveillance video to be distributed with high video quality, using the probability of collision $P_i$ of each agricultural machine 30 and the communication quality received by the network information receiving unit 105, and decides a communication bandwidth for the agricultural machine 30 regarding which the selected surveillance video is to be transmitted (step S106). That is to say, the video relay unit 106 selects the surveillance video of the agricultural machine $30_i$ regarding which the probability of collision $P_i$ is the highest as the surveillance video to be distributed with high video quality, and decides the communication bandwidth at which the agricultural machine 30 transmits this surveillance video to be a higher communication bandwidth than that decided in advance. Note that the video relay unit 106 may be able to be divided into a selecting unit that selects the surveillance video to be distributed at high video quality, and a control unit or a deciding unit that decides to set to a higher communication bandwidth, for example.

At this time, the video quality of the other surveillance videos other than this surveillance video may be lowered as necessary, and also the communication bandwidth for the agricultural machines 30 to transmit the other surveillance videos may be decided to be a communication bandwidth lower than that decided in advance. For example, an arrangement may be made in which the communication quality received by the network information receiving unit 105 is used to decide whether or not there is a need to lower the video quality of the other surveillance videos, and decision is made to lower the video quality of the other surveillance videos in accordance with the results of determination, and also the communication bandwidth for the agricultural machines 30 to transmit the other surveillance videos may be decided to be a lower communication bandwidth.

Note that in a case in which there is a plurality of agricultural machines $30_i$ of which the probability of collision $P_i$ is the highest, the video relay unit 106 may select the surveillance videos of these plurality of agricultural machines $30_i$ to be distributed at high video quality, and decide the communication bandwidth thereof to be a higher communication bandwidth. Conversely, in a case in which $P_1 = \ldots = P_M = 0$, the processing of this step is not performed.

Next, the video relay unit 106 decides whether or not $P_{max} = 0$ holds (step S107). $P_{max}$ here is the maximum value of $\{P_1, \ldots, P_M\}$.

In a case in which determination is not made in step S107 above that $P_{max} = 0$ holds, the video relay unit 106 changes the video quality (resolution, frame rate) of the camera 31 of each agricultural machine 30, in accordance with the communication bandwidth decided in the above step S106 (step S108). For example, in a case in which the communication bandwidth at which a certain agricultural machine 30 transmits surveillance video is decided to be 800 Mbps in the above step S106, the video relay unit 106 changes the video quality of the camera 31 of this agricultural machine 30 so that the surveillance video is receivable without delay at 800 Mbps, and also so that the video quality is highest. Accordingly, the camera 31 of the agricultural machine 30 regarding which the higher communication bandwidth is decided in the above step S106 is changed to higher video quality, and the cameras 31 of the agricultural machines 30 decided to a lower communication bandwidth are changed to lower image quality in the above step S106. Thus, by raising the video quality of the agricultural machine 30 regarding which the probability of colliding with some sort of object is higher, the surveillant can readily confirm the collision risk object by the surveillance video with high video quality, even in a case in which confirmation by surveillance video is difficult in normal image quality, due to factors of the size, color, etc., of the object that is the collision risk object, for example.

Next, the video relay unit 106 distributes the surveillance video of the agricultural machine $30_i$ of which the probability of collision $P_i$ is the highest to the surveillant terminal 20 (step S109). Accordingly, the surveillance video of the agricultural machine 30 of which the probability of colliding with some sort of object (more accurately, an object j of which the coefficient $a_j$ is not 0) by the time of day for ending farmwork is the highest is distributed to the surveillant terminal 20.

Note however, that the video relay unit 106 may also distribute surveillance videos of other agricultural machines 30 to the surveillant terminal 20, not only the surveillance video of the agricultural machine 30 of which the probability of collision $P_i$ is the highest. At this time, the surveillant terminal 20 side may display only the surveillance video of the agricultural machine 30 of which the probability of collision is the highest, for example, may display only a higher-order L (where L is an integer of 2 or greater that is decided in advance) number of surveillance videos in order of height of probability of collision, or may display a plurality of surveillance videos with just the surveillance video of the agricultural machine 30 of which the probability of collision is the highest being displayed in a different form (e.g., a form that attracts attention).

Conversely, in a case in which determination is made in step S107 above that $P_{max} = 0$ holds, the video relay unit 106 changes the video quality (resolution, frame rate) of the camera 31 of each agricultural machine 30 (i.e., agricultural machine $30_1, \ldots,$ agricultural machine $30_M$) to be the same (step S110). The reason is that in this case, none of the agricultural machines 30 will collide with an object (an object j of which the coefficient $a_j$ is not 0).

Next, the video relay unit 106 randomly selects one surveillance video out of the surveillance videos of the agricultural machines 30 (i.e., agricultural machine $30_1, \ldots,$ agricultural machine $30_M$), and distributes the selected surveillance video to the surveillant terminal 20 (step S111). Accordingly, only the one randomly selected surveillance video is distributed to the surveillant terminal 20. Note that a plurality of surveillance videos may be randomly selected at this time.

Following step S109 or step S111, the video relay unit 106 determines whether or not to end distribution of the surveillance video (step S112). Note that the video relay unit 106 can determine to end distribution of the surveillance video in a case in which, for example, the time of day for ending farmwork arrives, a time of day for ending distribution that is decided in advance arrives, or the like. Accordingly, the above step S104 to step S111 are repeatedly executed every predetermined duration of time until distribution of the surveillance video ends.

Second Embodiment

Next, a second embodiment will be described. Note that in the second embodiment, only the flow of video distribution processing differs from the first embodiment.

<Video Distribution Processing>

Figure 8:
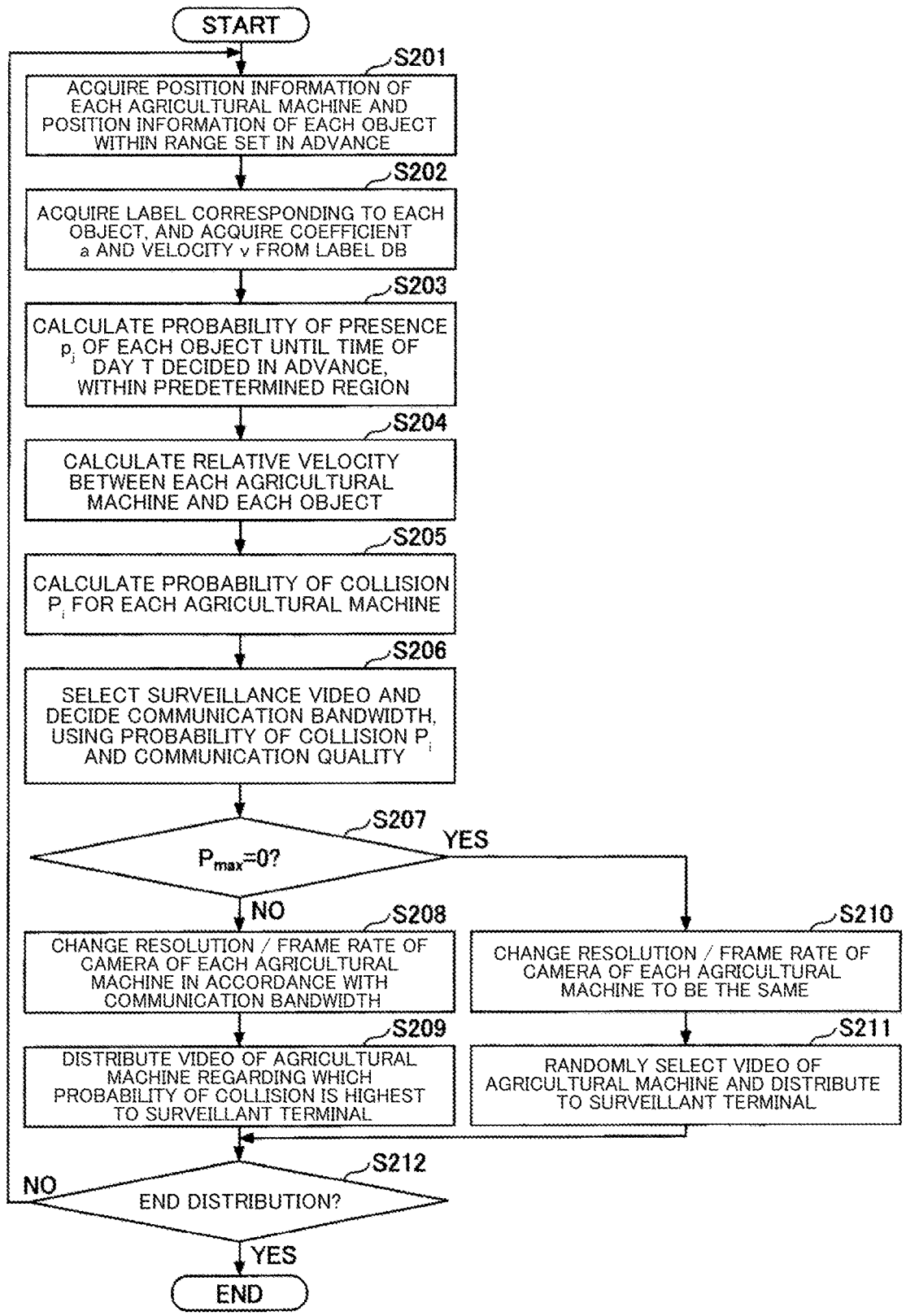
FIG. 8 is a flowchart showing an example of video distribution processing according to a second embodiment.

Next, video distribution processing for the video distribution server 10 according to the present embodiment to distribute surveillance video to the surveillant terminal 20 will be described with reference to FIG. 8. FIG. 8 is a flowchart showing an example of video distribution processing according to the second embodiment.

In the video distribution processing showing in FIG. 8, the processing of step S201 to step S212 is repeatedly executed every predetermined duration of time (e.g., every one second to several seconds, or the like). Note that the processing contents of step S201 to step S212 are each the same as the processing contents of step S101 to step S112 in FIG. 3.

Thus, in the second embodiment, acquisition of position information (step S201) and calculation of probability of presence (step S202) are also repeated every predetermined duration of time. Accordingly, while the amount of calculation of the video distribution server 10 increases, the probability of collision can be calculated with higher precision than in the first embodiment, since the probability of presence is calculated each time the probability of collision is calculated.

<Summarization>

As described above, the video distribution system 1 according to the first and second embodiments calculates the probability of the agricultural machines 30 colliding with some sort of object (an object j of which the coefficient aj is not 0) (probability of collision), and thereupon selects video of the agricultural machine 30 of which the probability of collision is high. Accordingly, raising the video quality of the selected video and distributing only the selected video to the surveillant terminal 20 is enabled, and displaying just the selected video in a different display form on the surveillant terminal 20, and so forth, can be performed. Thus, the load of surveillance on the surveillant is reduced or alleviated when performing surveillance of the agricultural machines 30, and one surveillant can perform surveillance of a greater number of agricultural machines 30. That is to say, a high level of scaling can be realized regarding the number of surveillance-object vehicles in autonomous driving.

The present invention is not limited to the above embodiments disclosed in detail, and various modifications, alterations, combinations with known art, and so forth, can be made without departing from the claims.

REFERENCE SIGNS LIST

1 Video distribution system
10 Video distribution server

11 Input device
12 Display device
13 External I/F
13a Recording medium
14 Communication I/F
15 Processor
16 Memory device
17 Bus
20 Surveillant terminal
30 Agricultural machine
31 Camera
32 GPS receiver
40 Camera
50 Pedestrian terminal
101 Position information managing unit
102 Relative velocity calculating unit
103 Probability of presence calculating unit
104 Probability of collision calculating unit
105 Network information receiving unit
106 Video relay unit
107 Label DB

The invention claimed is:

1. A video distribution device that distributes, to a terminal, one or more videos from a plurality of cameras installed in each of a plurality of vehicles that perform autonomous driving, the video distribution device comprising:
a probability of collision calculating unit, implemented using one or more computing devices, configured to calculate a probability of collision indicating a probability of the plurality of vehicles colliding with an object by a predetermined time of day;
a selecting unit, implemented using one or more computing devices, configured to select, among the one or more videos from the plurality of cameras, a video from a camera installed in a vehicle of which the probability of collision is highest; and
a controller configured to increase at least one of a frame rate or a resolution of the camera installed in the vehicle of which the probability of collision is highest to thereby increase video quality of the selected video.

2. The video distribution device according to claim 1, wherein the controller is configured to distribute, among the one or more videos from the plurality of cameras, the selected video to the terminal.

3. The video distribution device according to claim 1, wherein the controller is configured to reduce video quality of remaining videos among the one or more videos in accordance with communication quality between a communication network and the plurality of vehicles.

4. The video distribution device according to claim 1, further comprising:
a probability of presence calculating unit, implemented using one or more computing devices, configured to calculate a probability of presence indicating a probability of the object being present in a predetermined region by the predetermined time of day,
wherein the probability of collision calculating unit is configured to calculate, for each of the plurality of vehicles, the probability of collision, using collision permissible/impermissible information decided regarding each type of the object in advance.

5. The video distribution device according to claim 4, wherein the probability of collision calculating unit is configured to:
calculate the probability of collision without taking into consideration the probability of presence of the object in a case in which the collision permissible/impermissible information regarding the object is collision permissible, and
calculate the probability of collision taking into consideration the probability of presence of the object in a case in which the collision permissible/impermissible information regarding the object is collision impermissible.

6. The video distribution device according to claim 4, wherein the video distribution device is configured to calculate the probability of presence by the probability of presence calculating unit each time of calculating the probability of collision by the probability of collision calculating unit.

7. A video distribution method of a video distribution device that distributes, to a terminal, one or more videos from a plurality of cameras installed in each of a plurality of vehicles that perform autonomous driving, the video distribution method comprising:
calculating a probability of collision indicating a probability of the plurality of vehicles colliding with an object by a predetermined time of day;
selecting, among the one or more videos from the plurality of cameras, a video from a camera installed in a vehicle of which the probability of collision is highest; and
increasing at least one of a frame rate or a resolution of the camera installed in the vehicle of which probability of collision is highest to thereby increase video quality of the selected video.

8. The video distribution method according to claim 7, further comprising distributing, among the one or more videos from the plurality of cameras, the selected video to a terminal.

9. The video distribution method according to claim 7, further comprising reducing video quality of remaining videos among the one or more videos in accordance with communication quality between a communication network and the plurality of vehicles.

10. The video distribution method according to claim 7, further comprising:
calculating a probability of presence indicating a probability of the object being present in a predetermined region by the predetermined time of day,
wherein calculating the probability of collision comprises calculating, for each of the plurality of vehicles, the probability of collision, using collision permissible/impermissible information decided regarding each type of the object in advance.

11. The video distribution method according to claim 10, wherein calculating the probability of collision comprises:
calculating the probability of collision without taking into consideration the probability of presence of the object in a case in which the collision permissible/impermissible information regarding the object is collision permissible, and
calculating the probability of collision taking into consideration the probability of presence of the object in a case in which the collision permissible/impermissible information regarding the object is collision impermissible.

12. The video distribution method according to claim 10, wherein calculating the probability of presence comprises calculating the probability of presence each time of calculating the probability of collision.

13. A non-transitory computer recording medium storing a program, wherein execution of the program causes one or more computers to perform operations comprising:
- calculating a probability of collision indicating a probability of a plurality of vehicles colliding with an object by a predetermined time of day;
- selecting, among one or more videos from a plurality of cameras installed in each of the plurality of vehicles, a video from a camera installed in a vehicle of which the probability of collision is highest; and
- increasing at least one of a frame rate or a resolution of the camera installed in the vehicle of which probability of collision is highest to thereby increase video quality of the selected video.

14. The non-transitory computer recording medium according to claim 13, wherein the operations further comprise distributing, among the one or more videos from the plurality of cameras, the selected video to a terminal.

15. The non-transitory computer recording medium according to claim 13, wherein the operations further comprise reducing video quality of remaining videos among the one or more videos in accordance with communication quality between a communication network and the plurality of vehicles.

16. The non-transitory computer recording medium according to claim 13, wherein the operations further comprise:
- calculating a probability of presence indicating a probability of the object being present in a predetermined region by the predetermined time of day, and
- wherein calculating the probability of collision comprises calculating, for each of the plurality of vehicles, the probability of collision, using collision permissible/impermissible information decided regarding each type of the object in advance.

17. The non-transitory computer recording medium according to claim 16, wherein calculating the probability of collision comprises:
- calculating the probability of collision without taking into consideration the probability of presence of the object in a case in which the collision permissible/impermissible information regarding the object is collision permissible, and
- calculating the probability of collision taking into consideration the probability of presence of the object in a case in which the collision permissible/impermissible information regarding the object is collision impermissible.

18. The non-transitory computer recording medium according to claim 16, wherein calculating the probability of presence comprises calculating the probability of presence each time of calculating the probability of collision.

* * * * *